Jan. 21, 1969

G. E. HOLLIDAY 3,423,669

CAPACITIVE VOLTAGE DIVIDER

Filed Dec. 5, 1966

INVENTOR.
GEORGE E. HOLLIDAY
BY
John J. Leavitt

United States Patent Office 3,423,669
Patented Jan. 21, 1969

3,423,669
CAPACITIVE VOLTAGE DIVIDER

George E. Holliday, San Jose, Calif., assignor, by mesne assignments, to International Telephone and Telegraph Corporation, New York, N.Y., a corporation of Delaware
Filed Dec. 5, 1966, Ser. No. 599,269
U.S. Cl. 323—79         5 Claims
Int. Cl. H02p 13/00

This invention relates to voltage dividers, and more particularly to a voltage divider useful for accurate measurement of high voltages.

Voltage dividers are used for instance, to divide a high voltage into voltage levels of known ratio. Such divided voltage levels are then applied through appropriate circuitry to specific loads.

In general, voltage dividers have heretofore been expensive to fabricate and unwieldy in that their bulk was more than is convenient for one person to handle.

Another problem with conventional voltage dividers has been their tendency to be inaccurate in the ratios measured due to variations in temperature. It is one of the principal objects of this invention to provide a voltage divider which is simple in its construction, of small portable size, and which is accurate within 1%, with a negligible drift in the division ratio due to the effects of temperature variations, thus eliminating the disadvantages discussed above.

Another problem that has plagued the voltage divider art has been the tendency of conventional voltage dividers toward inaccuracy in the division of voltages as the result of extraneous influences. For instance, some conventional voltage dividers develop inaccuracies due to the mere movement in proximity to the voltage divider of the person operating the divider. This problem is two-fold. In one aspect the problem involves the sensitivity of the instrument in that it is advantageous that the instrument be sensitive in order to secure more accurate voltage division. In its other aspect, the problem involves the retention of sensitivity of the instrument while eliminating the tendency of the instrument to be effected by movement of operating personnel in the vicinity of the instrument which is obviously a disadvantage. It is therefore another of the objects of the invention to provide a voltage divider which is extremely sensitive so as to provide accuracy in the voltage division, but which is insensitive to extraneous influences tending to vary the voltage division ratios measured by the instrument.

Another object of the invention is to provide a voltage divider having a wide frequency band in the range of 60 cycles to 30 megacycles with an accuracy within 1%.

Some conventional voltage dividers have utilized a capacitive element to effect division of the voltage. These capacitors often enclose the capacitor elements within a vacuum envelope in order to provide the voltage stand-off required in high voltage applications. It is a still further object of this invention to provide a high voltage divider in which the capacitive elements of the voltage divider are separated by a solid dielectric.

Still another problem that has plagued the voltage divider art has been the tendency of voltage divider elements to heat excessively, thus causing a drift in the division ratio specified for the instrument. It is therefore another object of the invention to provide a voltage divider in which excessive heating does not occur.

Referring to the drawing.

Figure 1:
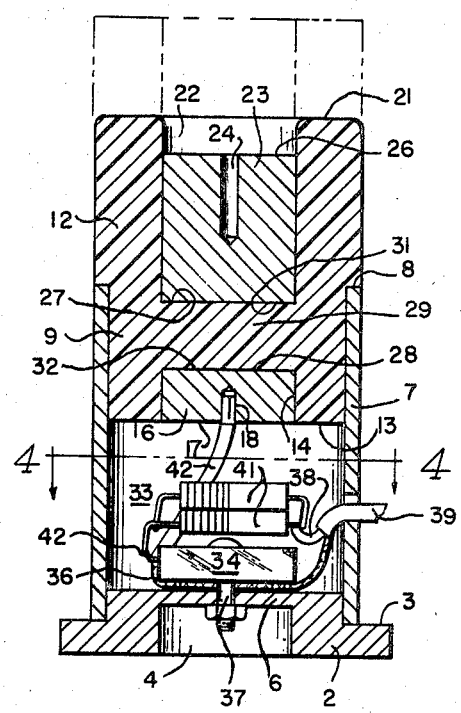
FIG. 1 is a vertical cross-sectional view of the voltage divider of the present invention taken in the plane indicated by the line 1—1 in FIG. 2.
Figure 2:
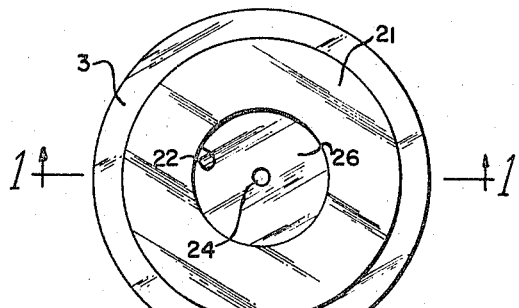
FIG. 2 is a plan view.
Figure 3:
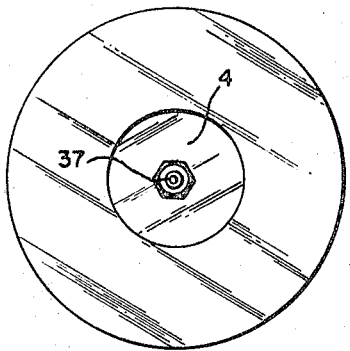
FIG. 3 is a bottom plan view.

In terms of broad inclusion, the voltage divider of the invention comprises a metallic base 2, having a shoulder 3 formed thereon adjacent its outer periphery as shown best in FIG. 1, and having recess 4 centrally disposed therein closed by bottom wall 6 as shown.

Seated on shoulder 3, and coaxially arranged with respect to the base is a tubular metallic shield member 7, the free end 8 of which lies spaced from end wall 6 a predetermined amount. Both the base and shield member are fabricated from non-magnetic material, such as aluminum. As shown in FIG. 1, shield member 7 is open at its end 8 remote from the base and receives therein a reduced-in-diameter section 9 of a dielectric plug 12. Dielectric material sold under the trademark "Teflon" has been found satisfactory. Within shield member 7, the inner end 13 of plug 12 is formed with a recess 14 of predetermined depth and diameter within which recess is tightly fitted a metallic capacitor electrode 16, preferably formed from a non-magnetic material such as aluminum. The depth of recess 14 is proportioned to receive capacitor element 16 so that the outer face 17 of the capacitor electrode lies flush with the inner end 13 of plug 12. Formed within capacitor electrode 16, and preferably centrally disposed, is recess 18 forming a socket for purposes which will hereinafter be explained.

The plug 12 at its upper end is provided with an end surface 21 having bore 22 therein within which is tightly fitted metallic capacitor electrode 23. The capacitor electrode is provided with a central bore 24 extending thereinto from the surface 26 which may be utilized to connect the voltage divider into a circuit.

The bore 22 is preferably coaxially disposed with respect to the outer periphery of dielectric plug 12, and therefore lies coaxially disposed with respect to shield member 7 and base 2.

Bore 22 possesses a depth such that the bottom 27 thereof and the bottom 28 of bore 14 define between them a dielectric web 29 having a predetermined thickness which functions to accurately space the inner end 31 of electrode 23 from the inner end 32 of electrode 16. Since, as shown clearly in FIG. 1, electrode 16 and 23 are provided with a predetermined diameter, and since dielectric web 29 spaces the opposed end surfaces of these two electrodes a predetermined distance apart, it will be obvious that the capacitance between these two electrodes can be very closely controlled.

It has been found that the sensitivity of a voltage divider device construction in the manner described is so extreme that, unless appropriate remedial steps are taken, the mere motion of the operator in the vicinity of the device will effect a variation in the division ratio. In order to retain this sensitivity while precluding variation in the division ratio by such an extraneous influence, it has been found that placement of the dielectric web 29 within the confines of shield member 7 as shown, so that the upper 8 of the shield member extends beyond the end surface 31 of electrode 23, results in the voltage division being substantially protected from these extraneous effects. Additionally, it has been found to be important to extend the shield member 7 so that it engages the base 2 and encloses hollow chamber 33 formed between base 2, electrode 16, and inner end 13 of plug 12.

Within shielded chamber 33 is detachably mounted a trimmer capacitor 34, which may conveniently be a variable non-vacuum capacitor having a capacitance characteristic in the range, for instance, of from 1000 to 5000 picofarads. In the instrument illustrated, the division ratio is approximately 1000:1 with the high voltage capacitor comprised of electrodes 16 and 23 separated by a dielectric web providing a capacitance of 0.8 picofarad. It will thus be seen that with the high voltage capacitance set at such a small value, it would not require much disturbance from extraneous effects to have a serious effect on the voltage division ratio.

As shown in FIG. 1, one terminal of the trimmer capacitor 34 is grounded through a cable 36 which is connected to one terminal of the capacitor and looped under the body thereof as shown so as to be clamped between the capacitor and base plate 6 by bolt 37. The ground cable is preferably of the braided type which forms a coaxial cable 39, the high voltage conductor of the cable being connected through a pair of parallel resistors 41 to the other terminal 42 of the trimmer capacitor. The ground terminal of trimmer capacitor 34 to which the braided cable 36 is attached is also connected through a lead 42 with socket 18 formed in capacitor electrode 16. A suitable resilient fitting is provided on the end of lead 42 for detachable engagement with the socket 18.

Figure 4:
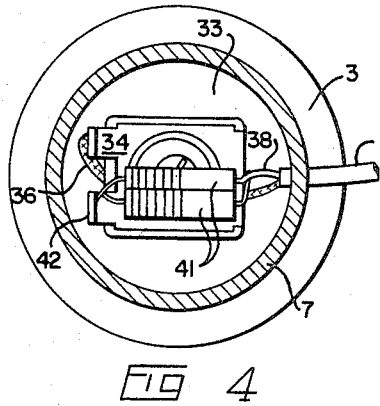
FIG. 4 is a horizontal cross-sectional view taken in the plane indicated by the line 4—4 in FIG. 1.
Figure 5:
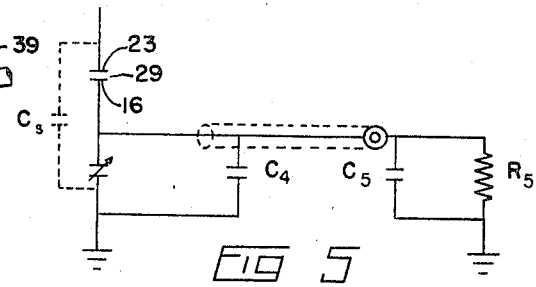
FIG. 5 is a schematic view of the electrical circuit embodied in the voltage divider illustrated in FIG. 1.

In FIG. 5 elements of the schematic circuit have been designated by numbers corresponding to the numbers applied to the structure illustrated in FIG. 1. For instance, in FIG. 5 the capacitor designated as 29 is composed of the "Teflon" web 29 illustrated in FIG. 1 and electrodes 16 and 23.

The capacitor $C_s$ illustrated in FIG. 5 designates the capacitance existing between shield member 7 and capacitor electrodes 16 and 23. In the device illustrated the value of this capacitance amounts to approximately 1.3 picofarads. It should be noted that this capacitance does not affect the division ratio. The capacitor designated $C_4$ in FIG. 5 represents the capacitance of the coaxial cable 39 which varies with the length of the cable and which does have an effect on the division ratio of the voltage divider. It is to compensate for variation in this value that trimmer capacitor 34 is interposed between the cable and the high voltage capacitor. Additionally, the capacitor designated $C_5$ in FIG. 5 represents the capacitance inherent in the oscilloscope input utilized with the voltage divider and in general its value is dependent on the particular oscilloscope being used. Typically, this value ranges to about 30 picofarads. The resistance designated as $R_5$ in FIG. 5 represents the input resistance of the oscilloscope and may typically range from about one to ten megohms.

The voltage divider as thus described has been found satisfactory to an accuracy within 1% for voltages ranging from 15,000 to 20,000 volts at frequencies ranging from 60 cycles to 30 megacycles. Such accuracy of voltage division at a division ratio of 1000:1 has not heretofore been achieved with conventional voltage dividers.

I claim:

1. A voltage divider comprising a metallic base, a tubular metallic shield member supported on the base and extending away therefrom, a solid dielectric plug extending into the open end of the tubular shield member for a predetermined distance, said solid dielectric plug having oppositely disposed bores therein having predetermined depths, a solid dielectric web disposed between the inner ends of said bores and forming an integral part of said dielectric plug, capacitor electrodes fitted within said bores so as to provide opposed conductive surfaces spaced apart a predetermined distance, and a trimmer capacitor having one terminal thereof connected to one of said first mentioned conductive surfaces and its other terminal connected to ground.

2. The combination according to claim 1 in which the dielectric plug extends into the open end of the tubular shield member for a predetermined distance so that the inner end of the plug and the base define a shielded chamber within which said trimmer capacitor is mounted.

3. The combination according to claim 1, in which said dielectric web lies within the tubular shield member.

4. The combination according to claim 1, in which said tubular shield member spans the space between opposed conductive surfaces.

5. The combination according to claim 1, in which cable connector means are provided to connect the voltage divider to a load.

References Cited

UNITED STATES PATENTS

| | | | |
|---|---|---|---|
| 2,148,607 | 2/1939 | De Lange | 317—242 |
| 2,159,793 | 5/1939 | Grundmann | 317—261 |
| 2,304,764 | 12/1942 | McAllister | 317—261 X |
| 3,101,443 | 8/1963 | Fried | 323—74 |
| 3,274,483 | 9/1966 | Tetz | 323—74 |

JOHN F. COUCH, *Primary Examiner.*

A. D. PELLINEN, *Assistant Examiner.*

U.S. Cl. X.R.

317—242, 256; 323—93